Figures 1, 2:
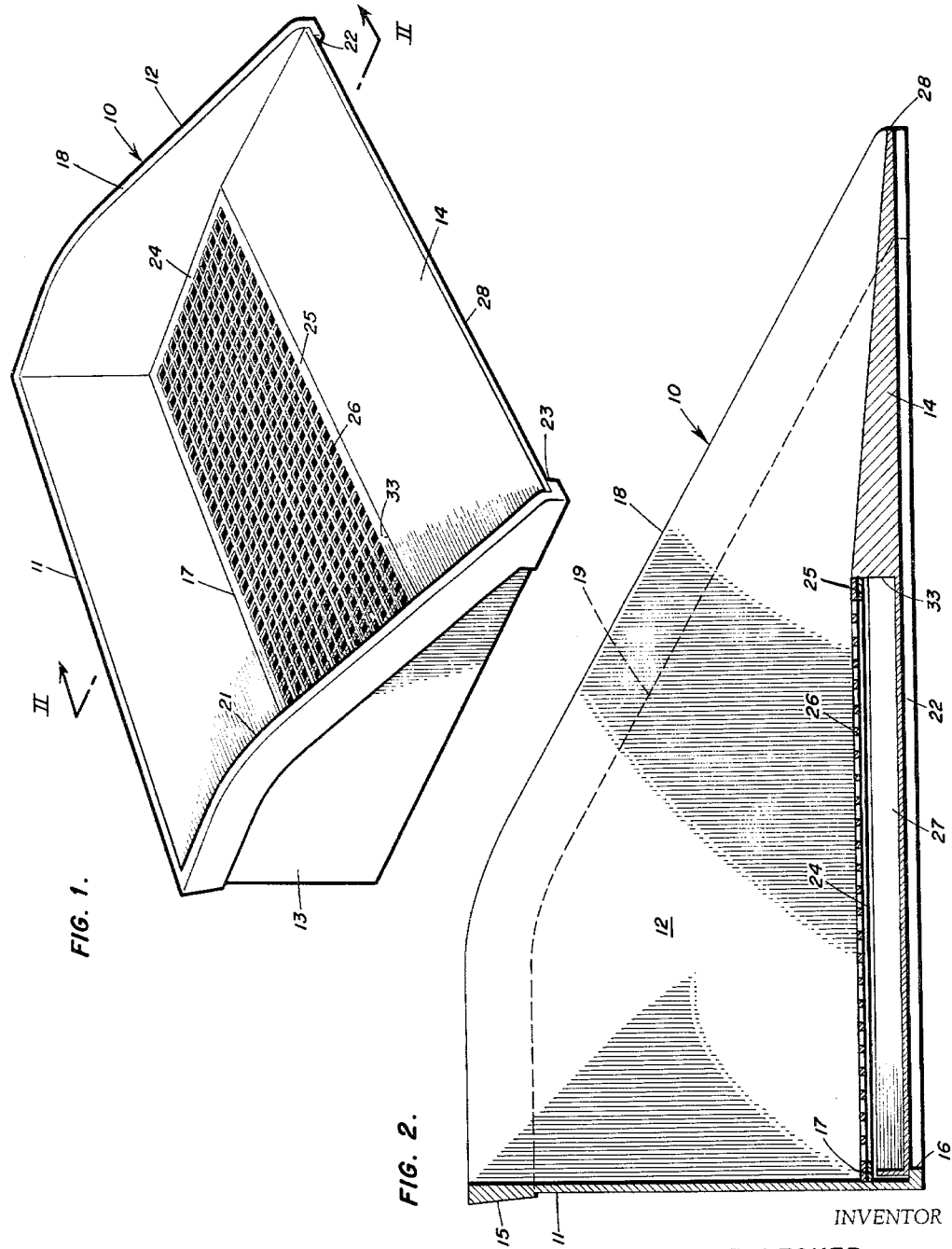

Feb. 22, 1966   H. F. BECKER   3,236,385
TRAY FOR FRIED FOODS
Filed Jan. 21, 1963   3 Sheets-Sheet 1

INVENTOR
HERMAN F. BECKER
BY Norman S. Blodgett
ATTORNEY

Feb. 22, 1966 H. F. BECKER 3,236,385
TRAY FOR FRIED FOODS
Filed Jan. 21, 1963 3 Sheets-Sheet 2

INVENTOR
HERMAN F. BECKER

BY Herman S. Blodgett
ATTORNEY

Feb. 22, 1966  H. F. BECKER  3,236,385
TRAY FOR FRIED FOODS
Filed Jan. 21, 1963  3 Sheets-Sheet 3
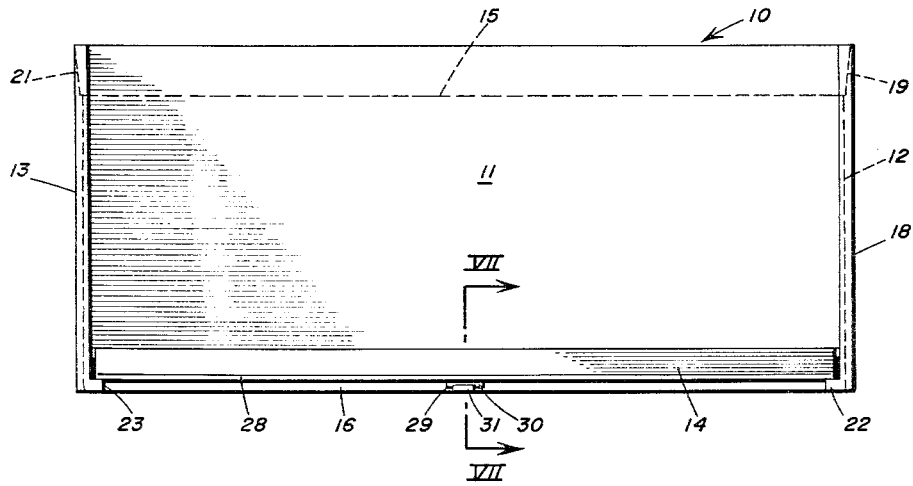
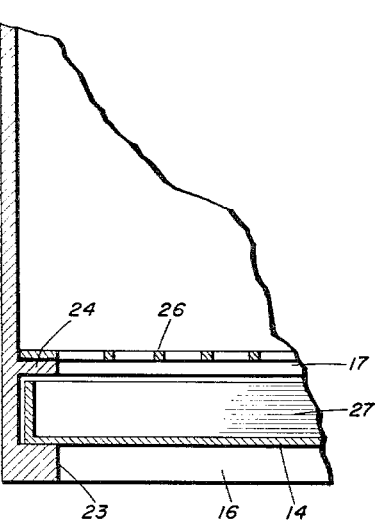
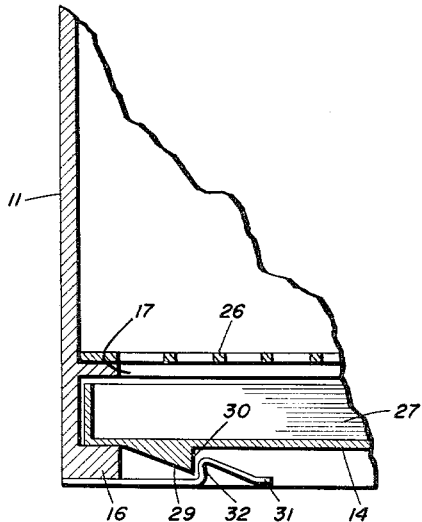
INVENTOR
*HERMAN F. BECKER*
BY *Norman S. Blodgett*
ATTORNEY

United States Patent Office 3,236,385
Patented Feb. 22, 1966

3,236,385
TRAY FOR FRIED FOODS
Herman F. Becker, 25 Thompson Road,
Webster, Mass.
Filed Jan. 21, 1963, Ser. No. 252,985
2 Claims. (Cl. 210—477)

This invention relates to a tray for fried foods, and more particularly, to apparatus arranged to facilitate the draining of oil from fried foods.

In frying foods, such as potatoes and the like, it is common practice to place the food in a metal basket and to lower the basket into hot oil. After the food has been in the oil for a certain length of time and has been cooked, the basket is raised to a position at the top of the container of oil and left there so that the oil may drain away. During the length of the time that the basket is thus held in its high position, the pool of oil is not available for cooking any other food. The tendency, then, is to permit the fried foods to drain for as little time as possible and then to transfer them out of the basket into another container. In the past, even in the most expensive restaurants, this container has taken the form of a corrugated cardboard box. Although the cardboard box is somewhat suitable for draining the fried foods, it is not only an unsanitary device but, in a short while, the box becomes soaked with oil and the pieces of food which are close to this oil-soaked surface do not have the oil drained from them. In addition, these parts of the food which are close to the bottom of the box receive the oil from the food stacked above them; the result is very poor drainage and unsanitary conditions. These and other difficulties have been obviated in a novel manner by the present invention.

It is, therefore, an outstanding object of the invention to provide a tray for fried foods or the like in which drainage of oil from the food takes place effectively and which may readily be cleaned for proper sanitation.

Another object of this invention is the provision of a tray for fried foods having a special receptacle to catch the oil which is drained, which receptacle may be readily removed and emptied.

A further object of the present invention is the provision of a tray for fried foods which may be readily disassembled for washing.

With these and other objects in view, as will be apparent to those skilled in the art, the invention resides in the combination of parts set forth in the specification and covered by the claims appended hereto.

Figure 3:
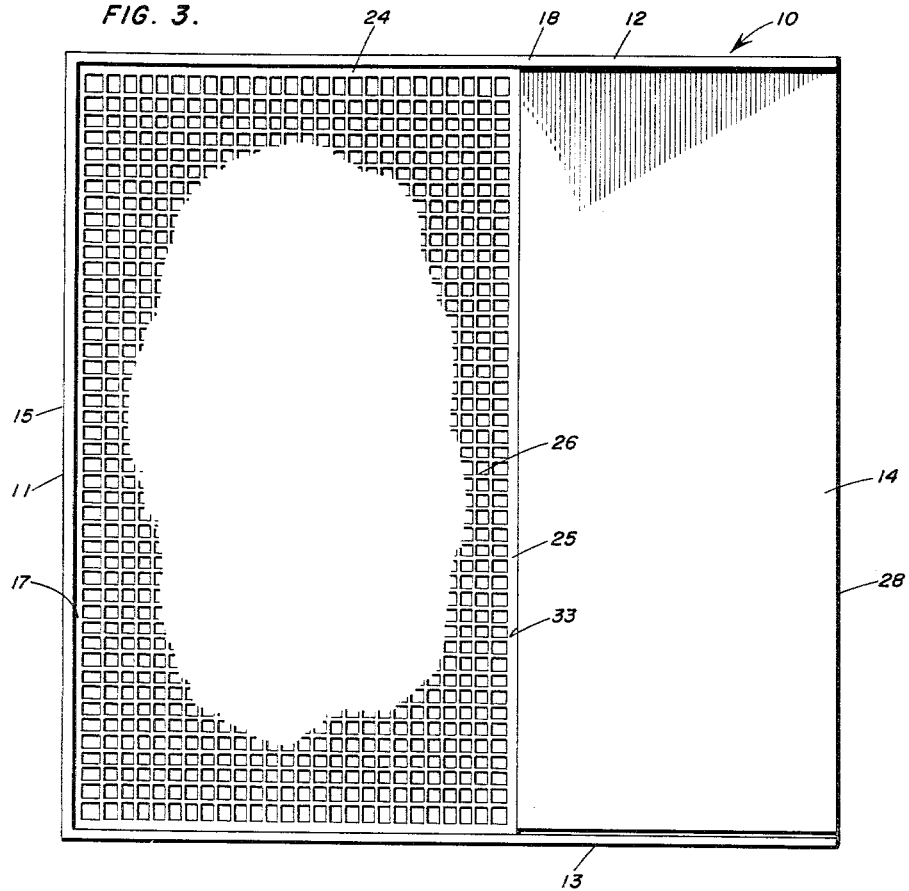
Figure 4:
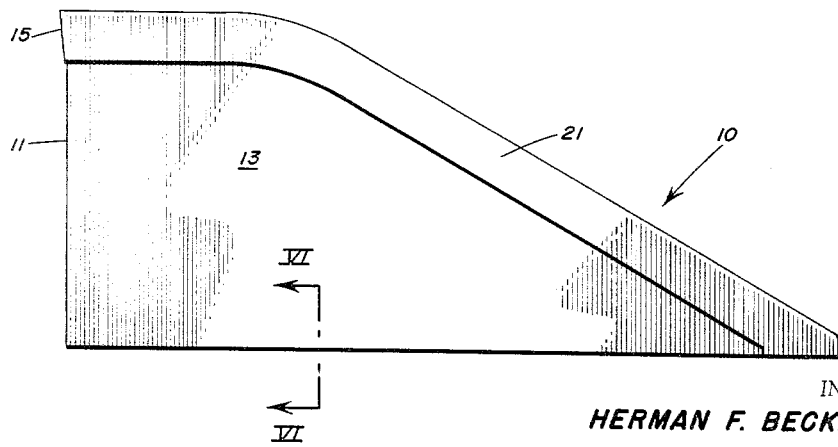

The character of the invention, however, may be best understood by reference to one of its structural forms as illustrated by the accompanying drawings in which:

FIG. 1 is a perspective view of a tray embodying the principles of the present invention, FIG. 2 is a vertical sectional view of the invention taken on the line II—II of FIG. 1, FIG. 3 is a plan view of the tray, FIG. 4 is a side elevational view of the tray, FIG. 5 is a front elevational view of the invention, FIG. 6 is an enlarged sectional view of a portion of the invention taken on the line VI—VI of FIG. 4, and FIG. 7 is an enlarged sectional view of a portion of the invention taken on the line VII—VII of FIG. 5.

Referring first to FIG. 1, wherein are best shown the general features of the invention, the tray, indicated generally by the reference numeral 10, is shown as consisting of a rear wall 11, a side wall 12, a side wall 13, and a bottom wall 14 and is formed of an oil-repellant, heat-resistant plastic.

The rear wall 11 is generally rectangular and is provided with a thickened ridge 15 extending along the top edge. It is also provided with an inwardly-directed flange 16 extending along the bottom edge. At a substantial distance above the flange 16 the rear wall 11 is provided with another flange 17.

The side wall 12 has an upper edge 18 which is provided with a thickened ridge 19 similar to the ridge 15 on the rear wall and joined to it where the walls meet. The upper edge 18 extends from the upper edge of the rear wall 11 forwardly horizontally for a short distance and then tapers downwardly to meet its own bottom edge at a sharp point located in line with the edge of the bottom wall 14 which is located away from the rear wall 11. Similarly, the side wall 13 is provided along its upper edge with a ridge 21 which meets the ridge 15 of the rear wall 11. The upper edge of the side wall 13 tapers downwardly in the same manner as the upper edge 18 of the side wall 12. The side wall 12 is provided along its bottom edge with an inwardly-directed flange 22 on which the bottom wall 14 rests, while the side wall 13 is provided along its bottom edge with an inwardly-directed flange 23 on which the bottom wall 14 also rests. Both walls are also provided with an inwardly-directed flange 24 which is located a substantial distance above the bottom flange and which joins the flange 17 of the rear wall 11. The flanges 24 extend away from the rear wall 11 a substantial distance but terminate before they reach the pointed end of their side walls. At the point of termination they are connected by a cross bar 25 in such a way that the flanges 17 and 24, and the bar 25 form a rectangular support or frame on which rests a plastic screen 26.

The bottom 14 is provided with a large rectangular recess 27 which exactly underlies the screen 26. From the front wall 33 of the recess 27, i.e., the portion furthest away from the rear wall 11, the wall (which is of substantial thickness throughout the area occupied by the recess) tapers forwardly to a sharp edge 28 located at the point of the side walls 12 and 13. It should be noted that the forward wall 33 of the recess extends upwardly above the upper edges of the bottom wall around the other sides of the recess by a short amount, so that it extends above the top edge of the bar 25 and engages the forward edge of the bar 25. As has been stated, the bottom wall 14 rests on three sides (that is to say, all sides except the edge 28) on the flanges 22, 23, and 16 which extend inwardly of the side and rear walls. Under its rear edge the bottom wall is provided with a downwardly-extending tooth 29 having a forwardly-directed vertical edge 30. A metal spring 31 is mounted under the bottom edge of the rear wall 11 and extends forwardly. The spring has a bent portion with a vertically-extending part 32 adapted to engage the vertical edge 30 of the tooth 29.

The operation of the invention will now be readily understood in view of the above description. Fried potatoes or other fried foods are emptied from the fry basket into the tray and the user will probably tilt the tray rearwardly so that all of the fried foods lie over the top of the screen 26. When the tray is again laid down on the top of a counter or other supporting surface, the oil will continue to drain from the foods through the screen 26 into the recess 27. In addition, small particles of food will also fall into the recess, because of a shaking action on the part of the user. After the foods have been thoroughly drained, the user will use the tray for placing portions of fried foods on diners' dishes. He does this by tilting the tray forwardly and slightly to the side so that the fried foods flow from the tray down the inclined surface of the bottom wall 14 off the edge 28 onto the dish, probably using the corner between the bottom 14 and one of the sides to direct the food into a limited area on the dish. From time to time the user will grasp the front edge of the bottom wall 14, release the spring 31 from the tooth 29 and draw the tray forwardly. He may then empty particles of food and oil from the recess and then replace it.

It can be seen that, since all of the materials used in the tray are of an oil-repellant heat-resistant plastic, no oil will soak into the parts to form an unsanitary situation. In addition, the bottom wall 14 may be withdrawn and the two parts of the tray separately washed. The plastic may be subjected to very hot water and strong detergent action without affecting its usefulness, so that any foods which may be lodged in cracks and crannies may be cleaned out, and all bacteria may be killed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A tray for fried foods and the like, comprising
 (a) a main body having a rear wall, two side walls, and a bottom wall, the bottom edges of the rear and side walls being provided with inwardly-directed flanges on which the bottom wall rests, the bottom wall being slidably movable away from the rear wall, the bottom wall having an upwardly-directed recess formed by opposite side walls and end walls, the rear and side walls of the main body also being provided with inwardly-directed second flanges spaced above the upper surface of the bottom wall, the main body being formed of an oil-impervious and heat-resistant material,
 (b) a screen resting on the second flanges overlying the recess, each side wall having the same height as the rear wall at the point where they are joined and having an upper edge which tapers downwardly from that point to meet its own bottom edge at the edge of the bottom wall which is opposite the rear wall, the bottom wall having substantial thickness near the outer edge of the recess but tapering to small thickness at the edge away from the rear wall.

2. A tray for fried foods and the like, comprising
 (a) a main body having a rear wall, two side walls, and a bottom wall, the bottom edges of the rear and side walls being provided with inwardly-directed flanges on which the bottom wall rests, the bottom wall being slidably movable away from the rear wall, the bottom wall having an upwardly-directed recess formed by opposite side walls and end walls, the rear and side walls of the main body also being provided with inwardly-directed second flanges spaced above the upper surface of the bottom wall, the main body being formed of an oil-impervious and heat-resistant material,
 (b) a screen resting on the second flanges overlying the recess, each side wall having the same height as the rear wall at the point where they are joined and having an upper edge which tapers downwardly from that point to meet its own bottom edge at the edge of the bottom wall which is opposite the rear wall, the bottom wall having substantial thickness near the outer edge of the recess but tapering to small thickness at the edge away from the rear wall, and
 (c) a latch extending between the rear wall and the bottom wall normally to prevent the said movement of the bottom wall.

References Cited by the Examiner

UNITED STATES PATENTS

| | | | |
|---|---|---|---|
| 1,217,314 | 2/1917 | Johnson | 209—419 |
| 1,284,942 | 11/1918 | Steindorf | 209—419 |
| 1,380,832 | 6/1921 | Nicholas | 209—419 |
| 2,293,228 | 8/1942 | Tucker | 209—257 |
| 2,367,794 | 1/1945 | Marselus | 210—482 X |
| 2,660,313 | 11/1953 | James | 210—474 X |
| 2,663,428 | 12/1953 | Hoaglund | 210—250 X |
| 2,732,696 | 1/1956 | Baker | 210—477 X |
| 2,848,938 | 8/1958 | Klein | 99—355 |
| 3,091,339 | 5/1963 | Marra et al. | 210—482 X |

FOREIGN PATENTS

| | | |
|---|---|---|
| 473,039 | 3/1959 | Canada. |
| 5,929 | 3/1905 | Great Britain. |
| 296,538 | 9/1928 | Great Britain. |
| 458,041 | 8/1942 | Great Britain. |

REUBEN FRIEDMAN, *Primary Examiner.*

HERBERT L. MARTIN, *Examiner.*